(12) United States Patent
Park

(10) Patent No.: US 9,139,161 B2
(45) Date of Patent: Sep. 22, 2015

(54) SAFETY DEVICE FOR SEAT BELT

(71) Applicant: HYUNDAI MOBIS CO., LTD., Seoul (KR)

(72) Inventor: Hong Sik Park, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/286,880

(22) Filed: May 23, 2014

(65) Prior Publication Data

US 2015/0145238 A1    May 28, 2015

(30) Foreign Application Priority Data

Nov. 27, 2013    (KR) .......................... 10-2013-0145502

(51) Int. Cl.
*B60R 22/46*    (2006.01)
*B60R 22/32*    (2006.01)
*B60R 22/22*    (2006.01)

(52) U.S. Cl.
CPC ................. *B60R 22/46* (2013.01); *B60R 22/22* (2013.01); *B60R 22/32* (2013.01); *B60R 22/4628* (2013.01); *B60R 22/4633* (2013.01)

(58) Field of Classification Search
CPC   B60R 22/32; B60R 22/325; B60R 2022/327; B60R 22/46; B60R 22/1955; B60R 22/4633
USPC .......................................... 280/806; 297/480
See application file for complete search history.

(56) References Cited

U.S. PATENT DOCUMENTS

| 6,123,166 | A  | * | 9/2000 | Verellen ........................ 180/268 |
| 2004/0150210 | A1 | * | 8/2004 | Cunningham et al. ......... 280/806 |
| 2010/0101060 | A1 | * | 4/2010 | Walega et al. ................... 24/603 |
| 2011/0049283 | A1 | * | 3/2011 | Nakaoka et al. ............... 242/374 |
| 2014/0224915 | A1 | * | 8/2014 | Yanagawa et al. ............ 242/382 |

FOREIGN PATENT DOCUMENTS

KR    10-2010-0032679 A    3/2010

* cited by examiner

*Primary Examiner* — Ruth Ilan
(74) *Attorney, Agent, or Firm* — Knobbe Martens Olson & Bear, LLP

(57) ABSTRACT

A safety device for a set belt includes a retractor having a rack gear on a circumferential outer surface of which the seat belt is wound; a pretensioner operated upon a collision of a car and rotating the rack gear in a direction for winding the seat belt; a release unit installed adjacent to the pretensioner, operated after the pretensioner operates the rack gear, and rotating the rack gear in a direction for unwinding the seat belt; and a switch unit receiving a manipulation force for operating the release unit, generating electricity, transferring the electricity to the release unit, and operating the release unit.

15 Claims, 11 Drawing Sheets

SAFETY DEVICE FOR SEAT BELT

CROSS-REFERENCES TO RELATED APPLICATIONS

The present application claims priority under 35 U.S.C 119(a) to Korean Patent Application No. 10-2013-0145502 filed on Nov. 27, 2013 in the Korean Intellectual Property Office, which is incorporated herein by reference in its entirety set forth in full.

BACKGROUND

Exemplary embodiments of the present invention relate to a safety device for a seat belt, and more particularly, to a safety device for a seat belt, which winds a seat belt upon a collision of a car and provides an operation of unwinding the seat belt when escaping the car, thereby improving the safety of an occupant.

In general, in a car, a safety belt is regarded as a device which most largely contributes for an occupant to survive upon an accident. When a collision of the car occurs, since a pretensioner operates first and tightens a loosely worn seat belt, the occupant may be kept positioned correctly. Since an air bag is deployed after the pretensioner operates, it is possible to minimize a shock applied to the occupant by the air bag.

In the conventional art, because a substantially large tension is applied to the seat belt due to the operation of the pretensioner, difficulties exist in unfastening the seat belt from a buckle after the deployment of the air bag. Therefore, it is demanded to cope with this problem.

The background art of the present disclosure is disclosed in Korean Unexamined Patent Publication No. 2010-0032679 (dated Mar. 26, 2010 and entitled "Lever Crank Type Pretensioner for Seat Belt")

SUMMARY

An embodiment of the present invention relates to a safety device for a seat belt, which winds a seat belt upon a collision of a car and provides an operation of unwinding the seat belt when escaping the car, thereby improving the safety of an occupant.

In an embodiment, a safety device for a set belt includes: a retractor having a rack gear on a circumferential outer surface of which the seat belt is wound; a pretensioner operated upon a collision of a car and rotating the rack gear in a direction for winding the seat belt; a release unit installed adjacent to the pretensioner, operated after the pretensioner operates the rack gear, and rotating the rack gear in a direction for unwinding the seat belt; and a switch unit receiving a manipulation force for operating the release unit, generating electricity, transferring the electricity to the release unit, and operating the release unit.

The pretensioner includes a movable gear having a side surface on which teeth to be meshed with the rack gear are formed; a first support member supporting the movable gear; and a first explosion part exploded by an operation of an impact sensor, and moving the first support member in a direction facing the rack gear.

The pretensioner and the release unit are disposed in a housing, and the first support member is pushed by a pressure of a gas produced due to an operation of the first explosion part and is moved in the housing.

The first explosion part is disposed in a first projection, and the gas produced as the first explosion part is operated moves the first support member and the movable gear in a direction facing away from the first explosion part.

The release unit includes a release gear disposed at a position opposite to the movable gear; a second support member supporting the release gear; and a second explosion part exploded by the electricity transferred from the switch unit, and moving the second support member in a direction facing the first support member.

A pair of movable gears are installed on the first support member to be parallel to each other, and a pair of release gears for pushing the movable gears are installed on the second support member to be parallel to each other.

The pretensioner and the release unit are disposed in a housing, and the second support member is pushed by a pressure of a gas produced due to an operation of the second explosion part and is moved in the housing.

The second explosion part is disposed in a second projection, and the gas produced as the second explosion part is operated moves the second support member and the release gear in a direction facing away from the second explosion part.

The switch unit includes a case defining an outer shape of the switch unit; a button member installed in the case and operated in a push type; a first connection part connecting the button member and the pretensioner, separated from the button member by an operation of the pretensioner, and releasing restriction of the button member; and a second connection part converting a pressing operation of the button member into electricity, and transferring the electricity to the release unit.

The second connection part includes a piezoelectric ceramic receiving a pressure through the button member, and generating electricity; and a connection core wire transferring the electricity generated by the piezoelectric ceramic, to the release unit.

The safety device further includes a safety latch connected to one end of the seat belt which is installed in a shape passing over the abdomen of an occupant; a fastening buckle having a mounting space into which the safety latch is inserted, and secured to the car; a latch restriction part installed to be movable into and out of the fastening buckle, and fastened to the fastening buckle through the safety latch; and a release wire inserted into the fastening buckle, passing through the latch restriction part, moved by an operation of the release unit, and releasing restriction of the latch restriction part.

The fastening buckle includes a buckle housing secured to the car, and having a buckle hole which allows the latch restriction part to pass therethrough; and a guide member secured in the buckle housing, formed into a shape for receiving the latch restriction part, and guiding movement of the latch restriction part.

The latch restriction part includes a restriction body extending in a vertical direction; engagement protrusions projecting from side surfaces of the restriction body to be engaged with the safety latch; and a transverse hole defined through the restriction body, and allowing the release wire to be inserted therethrough.

One end of the release wire is connected to the second support member of the release unit, and the other end of the release wire is movable through the transverse hole of the restriction body.

The safety device further includes an elastic member having a lower end which is connected to the guide member and an upper end which is connected to the latch restriction part, and pulling the latch restriction part in a direction facing the guide member by elastic force.

According to the embodiment of the present disclosure, in a safety device for a seat belt, since a pretensioner operates and winds the seat belt by a predetermined length upon a collision of a car and then an air bag may be deployed, a shock applied to an occupant by the air bag may be reduced, whereby the safety of the occupant may be improved.

Also, according to the embodiment of the present disclosure, since manipulation of a switch unit for operating a release unit may be possible after the pretensioner operates, the misoperation of the release unit may be prevented, whereby the occurrence of a safety-related accident may be prevented.

Further, according to the embodiment of the present disclosure, since the release unit is operated and decreases the tension of the safety belt after the pretensioner operates, the seat belt may be easily unfastened from a buckle, whereby the occupant may safely escape the car.

Moreover, according to the embodiment of the present disclosure, since a safety latch may be unfastened from a fastening buckle for fastening the seat belt as a release wire is disengaged from a latch restriction part in conformity with the operation of the release unit, the safety of the occupant may be further improved.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
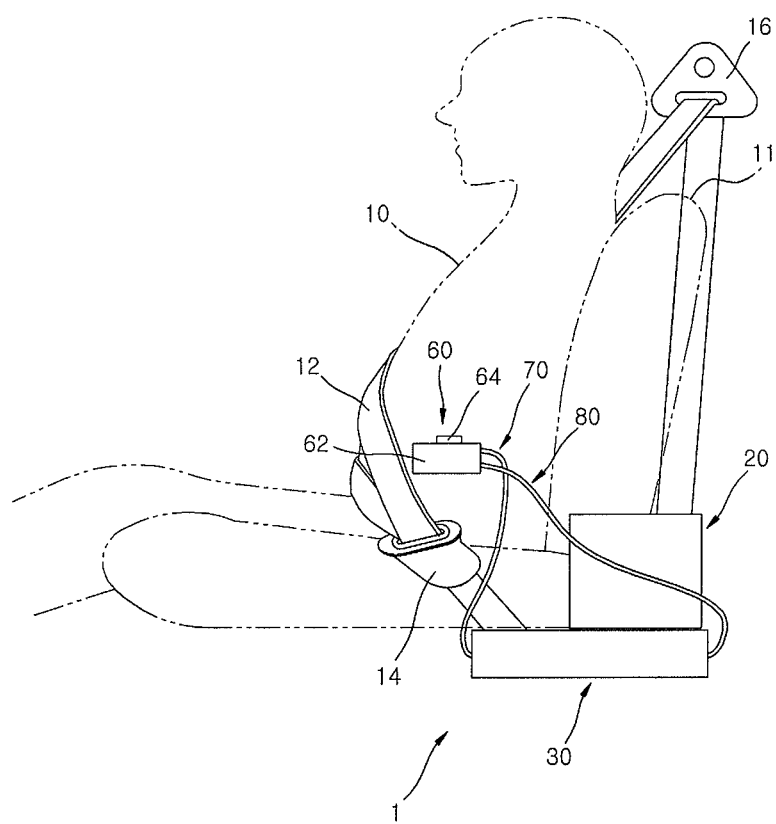
FIG. 1 is a side view schematically illustrating a state in which a safety device for a seat belt in accordance with an embodiment of the present disclosure is installed.
Figure 2:
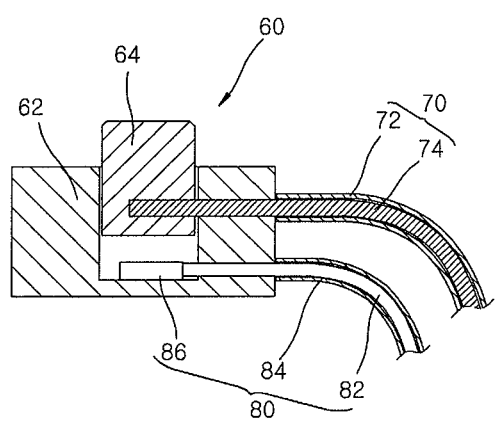
FIG. 2 is a cross-sectional view schematically illustrating a switch unit in accordance with the embodiment of the present disclosure.
Figure 3:
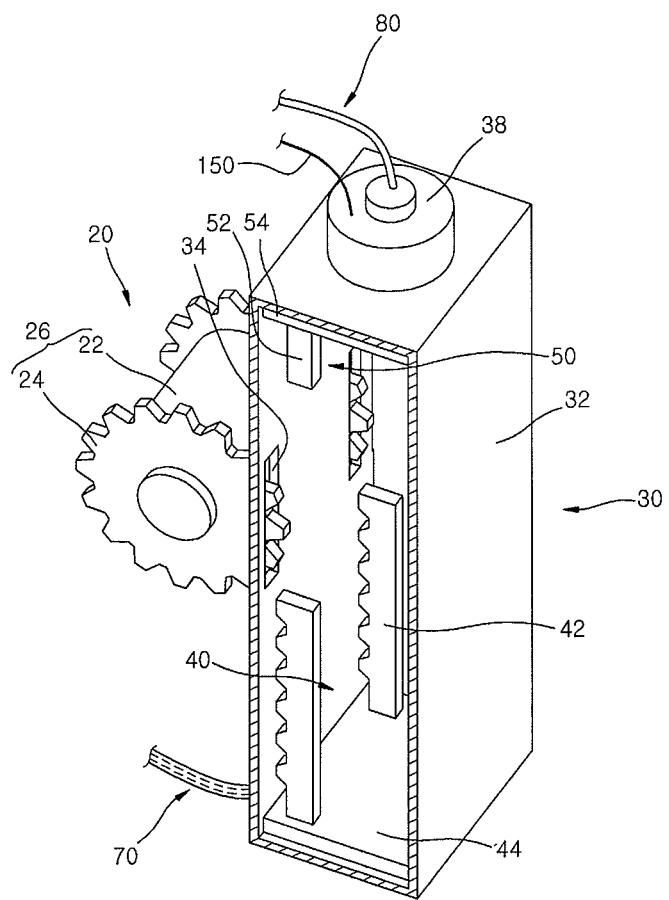
FIGS. 3 and 4 are broken-away perspective views schematically illustrating the main construction of a safety driving section in accordance with the embodiment of the present disclosure.
Figure 4:
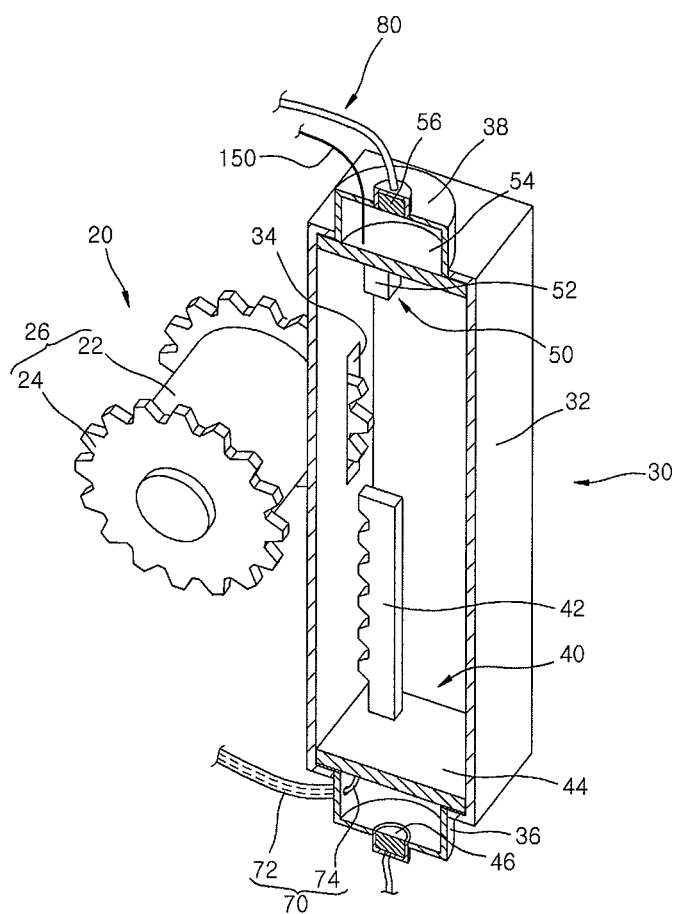
Figure 8:
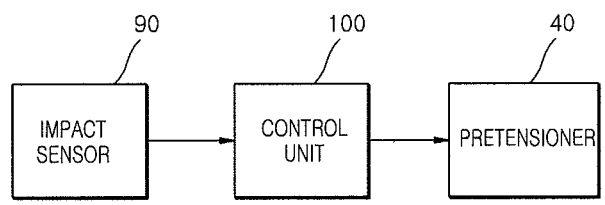
FIG. 8 is a block diagram of the safety device for a seat belt in accordance with the embodiment of the present disclosure.

FIG. 1 is a side view schematically illustrating a state in which a safety device for a seat belt in accordance with an embodiment of the present disclosure is installed, FIG. 2 is a cross-sectional view schematically illustrating a switch unit in accordance with the embodiment of the present disclosure, FIGS. 3 and 4 are broken-away perspective views schematically illustrating the main construction of a safety driving section in accordance with the embodiment of the present disclosure, and FIG. 8 is a block diagram of the safety device for a seat belt in accordance with the embodiment of the present disclosure.

As shown in FIGS. 1, 4, 8 and 9, a safety device 1 for a seat belt in accordance with an embodiment of the present disclosure includes a retractor 20 which has a rack gear 26 on the circumferential outer surface of which a seat belt 12 is wound, a pretensioner 40 which is operated upon a collision of a car and rotates the rack gear 26 in a direction for winding the seat belt 12, a release unit 50 which is disposed adjacent to the pretensioner 40, is operated after the pretensioner 40 rotates the rack gear 26 and rotates the rack gear 26 in a direction for unwinding the seat belt 12, and a switch unit 60 which is applied with a manipulation force for operating the release unit 50, generates electricity, transfers the electricity to the release unit 50 and operates the release unit 50.

The seat belt 12 is worn on the body of an occupant 10 who is seating on a seat 11, and is connected to a buckle 14. In detail, one end of the seat belt 12 is connected to the retractor 20 through an anchorage 16, and the other end of the seat belt 12 passes sequentially over the chest of the occupant 10 and a tongue 13 and then over the abdomen of the occupant 10 and is connected to a safety latch 120.

The retractor 20 retracts the seat belt 12 with a predetermined tension and prevents the seat belt 12 from being wound, when the body of the occupant 10 moves forward during a collision or a sudden stop, to reduce injuries to the occupant 10.

The rack gear 26 is rotatably disposed in the retractor 20, and the seat belt 12 is wound on the circumferential outer surface of the rack gear 26.

The rack gear 26 is constituted by a circular column-shaped rotation member 22 on the circumferential outer surface of which the seat belt 12 is wound, and disc-shaped circular gears 24 which are respectively installed on both ends of the rotation member 22.

Teeth are formed on the circumferences of the circular gears 24, and portions of the circular gears 24 project into a housing 32 of a safety driving section 30.

Various kinds of driving devices may be used as the safety driving section 30 so long as they fall within a technical spirit that the safety driving section 30 rotates the rack gear 26 and winds the seat belt 12 before an air bag is deployed and is then operated by the manipulation force from the occupant 10 and rotates the rack gear 26 in the direction for unwinding the seat belt 12 after the air bag is deployed.

The safety driving section 30 according to the embodiment includes the housing 32, the pretensioner 40, and the release unit 50.

The pretensioner 40 and the release unit 50 are disposed in the housing 32, and openings 34 are defined through a side wall of the housing 32 which faces the retractor 20.

The rack gear 26 is installed such that portions of the rack gear 26 project into the housing 32 through the openings 34.

A first projection 36 projects from one end (the lower end in FIG. 4) of the housing 32, and a second projection 38 projects from the other end (the upper end in FIG. 4) of the housing 32.

The pretensioner 40 is installed in the housing 32 adjacent to the one end of the housing 32. Various kinds of driving devices may be used as the pretensioner 40 so long as they fall within a technical spirit that the pretensioner 40 is operated upon a collision of a car and rotates the rack gear 26 in the direction for winding the seat belt 12.

The pretensioner 40 in accordance with the embodiment of the present disclosure includes movable gears 42 on the side surfaces of which teeth to be meshed with the rack gear 26 are formed, a first support member 44 which supports the movable gears 42, and a first explosion part 46 which is exploded by an operation of an impact sensor 90 and moves the first support member 44 in a direction where the movable gears 42 are meshed with the rack gear 26.

In the case where the space defined in the housing 32 extends in a vertical direction, the movable gears 42 are disposed to be moved in the vertical direction.

The teeth to be meshed with the portions of the circular gears 24 which project into the housing 32 are formed on the side surfaces of the movable gears 42. The movable gears 42 are disposed in a pair on the first support member 44 in such a way as to be parallel to each other.

The first support member 44 is installed on the lower ends of the movable gears 42 in a horizontal direction (when viewed in FIG. 4), and the first explosion part 46 is disposed below the first support member 44.

The first explosion part 46 is disposed on the bottom of the first projection 36. The gas produced as the first explosion part 46 is operated pushes the first support member 44 and the movable gears 42 upwards.

The first explosion part 46 is operated by a control signal from a control unit 100 which is transferred with a sensing value of the impact sensor 90.

The first support member 44 is restricted in its movement by protrusions which protrude into the housing 32, and is moved in the housing 32 by being pushed by the pressure of the gas produced by the operation of the first explosion part 46.

As shown in FIGS. 1 to 4, the release unit 50 is disposed adjacent to the pretensioner 40. Various kinds of driving devices may be used as the release unit 50 so long as they fall within a technical spirit that the release unit 50 is operated after the pretensioner 40 rotates the rack gear 26 and then rotates the rack gear 26 in the direction for unwinding the seat belt 12.

The release unit 50 according to the embodiment of the present disclosure includes release gears 52 which are disposed at positions opposite to the movable gears 42, a second support member 54 which supports the release gears 52, and a second explosion part 56 which is exploded by the electricity transferred from the switch unit 60 and moves the second support member 54. toward the first support member 44.

The release unit 50 positioned at the upper end of the housing 32 is disposed opposite the pretensioner 40.

The release gears 52 are upwardly disposed to be opposite to the movable gears 42. The release gears 52 for pushing the movable gears 42 are disposed in a pair on the second support member 54 in such a way as to be parallel to each other, by which pushing of the movable gears 42 may be stably carried out.

The release gears 52 may be formed into various shapes without departing from a technical spirit that they push the movable gears 42 downward.

The release gears 52 according to the embodiment are formed into rod shapes, and the second support member 54 is disposed on the upper ends of the release gears 52 to be placed in the horizontal direction.

The first support member 44 is restricted in its movement by the protrusions which protrude into the housing 32, and is moved in the housing 32 by being pushed by the pressure of the gas produced by the operation of the first explosion part 46.

The second support member 54 is restricted in its movement by protrusions which protrude into the housing 32, and is moved in the housing 32 by being pushed by the pressure of the gas produced by the operation of the second explosion part 56.

The second explosion part 56 is disposed on the top of the second projection 38. The gas produced as the second explosion part 56 is operated pushes the second support member 54 and the release gears 52 downwards.

Various kinds of switches may be used as the switch unit 60 so long as they fall within a technical spirit that the switch unit 60 is applied with a manipulation force for operating the release unit 50, generates electricity, transfers the electricity to the release unit 50 and operates the release unit 50.

The switch unit 60 according to the embodiment of the present disclosure includes a case 62 which defines the outer shape of the switch unit 60, a button member 64 which is installed in the case 62 and is operated in a push type, a first connection part 70 which connects the button member 64 and the pretensioner 40 and is separated from the button member 64 by the operation of the pretensioner 40 to release the button member 64 from restriction, and a second connection part 80 which converts a pushing operation for the button member 64 into electricity and transfers the electricity to the release unit 50.

The switch unit 60 is disposed at a position where it is convenient to manipulate the switch unit 60. The button member 64 is installed on the case 62 which defines the outer shape of the switch unit 60.

The button member 64 is operated by a pushing operation, and the first connection part 70 is inserted through a side of the button member 64.

The first connection part 70 includes a first covering member 72 and a core wire 74. One end of the core wire 74 is connected to the first support member 44 or the movable gears 42 of the pretensioner 40, and the other end of the core wire 74 is inserted through the side of the button member 64.

Since the first covering member 72 surrounds the outer surface of the core wire 74, interference between the core wire 74 and a surrounding object is prevented when the core wire 74 is moved in conformity with the operation of the pretensioner 40.

Various types of electricity generation devices may be used as the second connection part 80 so long as they fall within a technical spirit that the second connection part 80 converts a pushing operation for the switch unit 60 into electricity and transfers the electricity to the release unit 50.

The second connection part 80 according to the embodiment of the present disclosure includes a piezoelectric ceramic 86 which is applied with a pressure through the button member 64 and generates electricity, a connection core wire 82 which transfers the electricity generated by the piezoelectric ceramic 86, to the release unit 50, and a second covering member 84 which surrounds the outer surface of the connection core wire 82.

The piezoelectric ceramic 86 as an element which generates a voltage when a pressure is applied thereto may covert mechanical vibration energy into electrical energy or vice versa, and has high conversion efficiency.

The piezoelectric ceramic 86 is disposed below the button member 64. The connection core wire 82, which transfers the electricity generated by the piezoelectric ceramic 86, to the second explosion part 56 of the release unit 50, is formed of a conductor as a main material.

The second covering member 84 is placed around the outer surface of the connection core wire 82 and prevents electricity flowing through the connection core wire 82, from being directed to another member.

The impact sensor 90 installed in the car senses an impact of the car and transfers a sensing value to the control unit 100, and the control unit 100 operates the air bag and the pretensioner 40 based on the sensing value of a speed sensor and the sensing value of the impact sensor 90.

Figure 9:
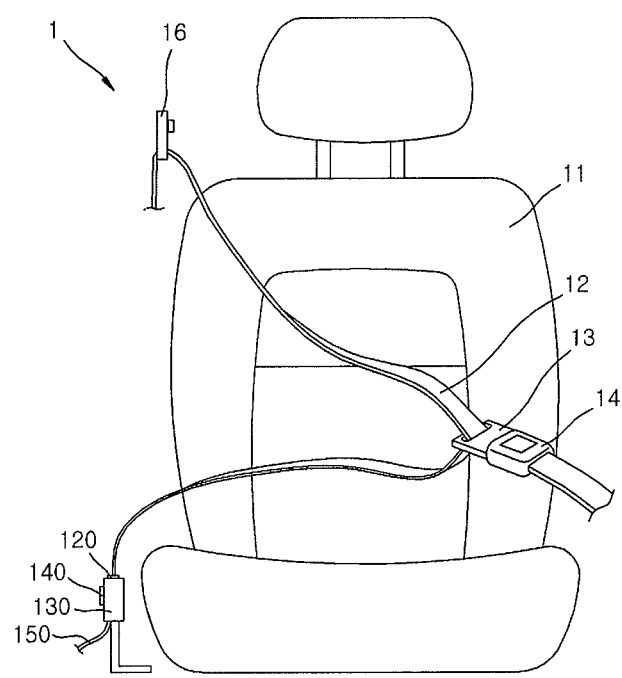
FIG. 9 is a front view schematically illustrating a state in which a safety latch in accordance with the embodiment of the present disclosure is fastened to a fastening buckle.
Figure 10:
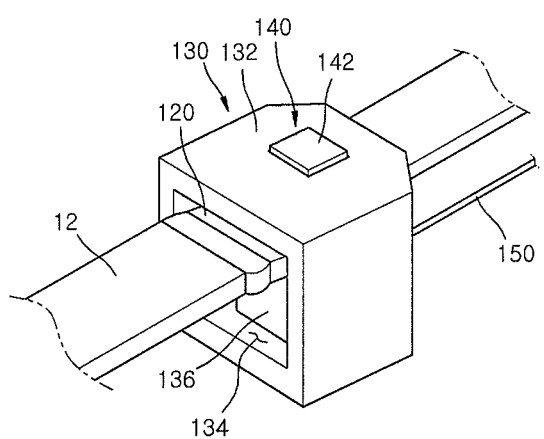
FIG. 10 is a perspective view schematically illustrating the state in which the safety latch in accordance with the embodiment of the present disclosure is fastened to the fastening buckle.
Figure 11:
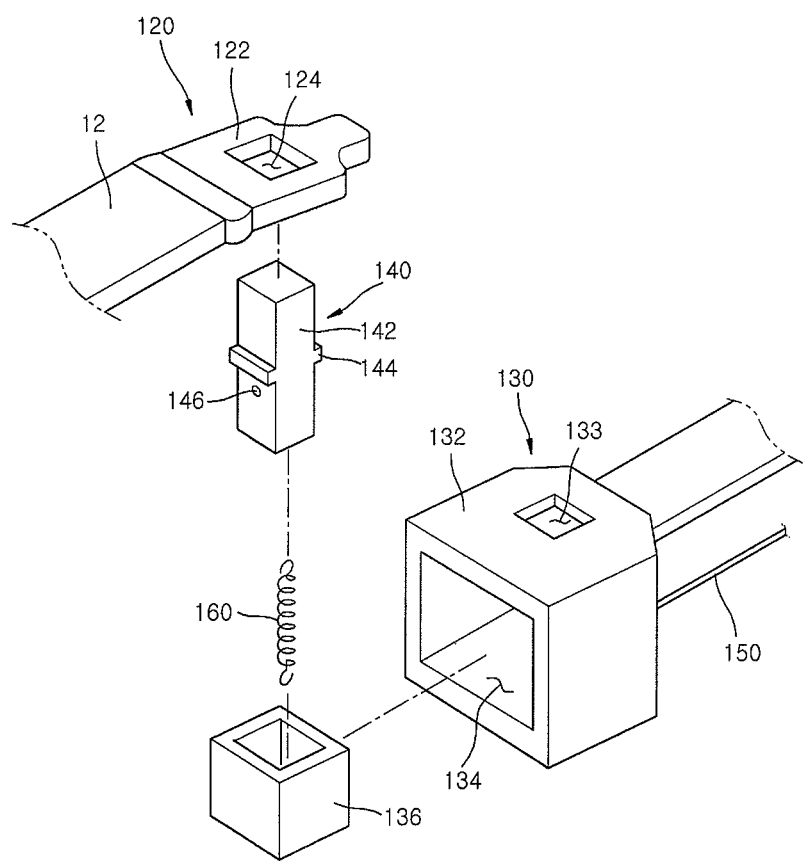
FIG. 11 is an exploded perspective view schematically illustrating the state in which the safety latch in accordance with the embodiment of the present disclosure is unfastened from the fastening buckle.
Figure 12:
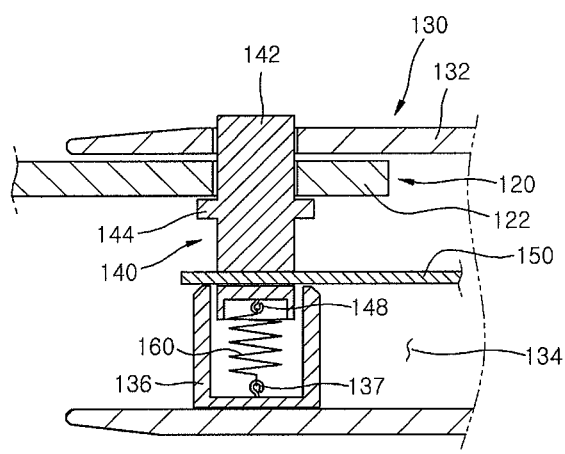
FIG. 12 is a cross-sectional view schematically illustrating the state in which the safety latch in accordance with the embodiment of the present disclosure is fastened to the fastening buckle.
Figure 13:
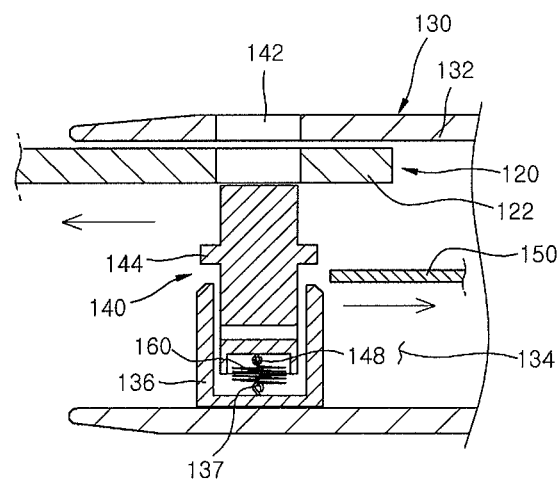
FIG. 13 is a cross-sectional view schematically illustrating the state in which the safety latch in accordance with the embodiment of the present disclosure is unfastened from the fastening buckle.

FIG. 9 is a front view schematically illustrating a state in which the safety latch in accordance with the embodiment of the present disclosure is fastened to a fastening buckle, FIG. 10 is a perspective view schematically illustrating the state in which the safety latch in accordance with the embodiment of the present disclosure is fastened to the fastening buckle, FIG. 11 is an exploded perspective view schematically illustrating the state in which the safety latch in accordance with the embodiment of the present disclosure is unfastened from the fastening buckle, FIG. 12 is a cross-sectional view schematically illustrating the state in which the safety latch in accordance with the embodiment of the present disclosure is fastened to the fastening buckle, and FIG. 13 is a cross-sectional view schematically illustrating the state in which the safety latch in accordance with the embodiment of the present disclosure is unfastened from the fastening buckle.

As shown in FIGS. 9 to 13, the safety device 1 for a seat belt in accordance with the embodiment of the present disclosure further includes the safety latch 120, a fastening buckle 130, a latch restriction part 140, a release wire 150, and an elastic member 160.

The safety latch 120 is connected to the other end of the seat belt 12 (on the left side of the seat 11 when viewed in FIG. 9) which is installed to pass over the abdomen of the occupant 10.

The safety latch 120 according to the embodiment of the present disclosure includes a latch body 122 which has the shape of a metal piece, and an engagement hole 124 which is defined to pass through the latch body 122.

The engagement hole 124 is defined in a shape corresponding to the cross-section of the latch restriction part 140. Since the engagement hole 124 and the latch restriction part 140 according to the embodiment of the present disclosure are defined and formed to have a quadrangular sectional shape, rotation of the safety latch 120 is restricted when the latch restriction part 140 is inserted through the engagement hole 124.

The fastening buckle 130 may be formed into various shapes so long as it falls within a technical spirit that it defines a mounting space 134 into which the safety latch 120 is inserted to be secured with respect to the car.

The fastening buckle 130 according to the embodiment of the present disclosure includes a buckle housing 132 which is secured to the car and has a buckle hole 133 for allowing the latch restriction part 140 to pass therethrough, and a guide member 136 which is secured in the buckle housing 132 and is formed into a shape capable of receiving the latch restriction part 140 to guide the movement of the latch restriction part 140.

The buckle housing 132 is open in a direction in which the safety latch 120 is inserted into the buckle housing 132, and the buckle hole 133 is defined through the upper wall of the buckle housing 132 (when viewed in FIG. 11) such that the latch restriction part 140 may be moved through the buckle hole 133.

The guide member 136 is secured in the buckle housing 132 and guides the expansion and contraction of the elastic member 160.

Since the guide member 136 is formed into a quadrangular box shape which is open at the upper end thereof, the upward and downward movement of the latch restriction part 140 having the quadrangular cross-sectional shape and the movement of the elastic member 160 connected to the latch restriction part 140 and the bottom of the guide member 136 is guided.

The latch restriction part 140 is movably disposed in the fastening buckle 130. The latch restriction part 140 may be formed into various shapes so long as it falls within a technical spirit that it is engaged with the fastening buckle 130 by passing through the engagement hole 124 of the safety latch 120.

The latch restriction part 140 according to the embodiment of the present disclosure includes a restriction body 142, engagement protrusions 144, a transverse hole 146, and a hook element 148.

The restriction body 142 is formed to have a quadrangular sectional shape and extends in the vertical direction. The engagement protrusions 144 protrude from side surfaces of the restriction body 142 to be engaged with the lower surface of the latch body 122.

Since the engagement protrusions 144 are engaged with the latch body 122, it is possible to prevent the latch restriction part 140 from being discharged out of the fastening buckle 130 through the buckle hole 133.

The transverse hole 146 is defined to transversely pass through the restriction body 142. The release wire 150 is inserted through the transverse hole 146 to restrict the upward and downward movement of the latch restriction part 140.

The release wire 150 is inserted into the fastening buckle 130, passes through the latch restriction part 140, and is moved by the operation of the release unit 50 to release the restriction of the latch restriction part 140.

One end of the release wire 150 is connected to the second support member 54 of the release unit 50, and the other end of the release wire 150 is movable through the transverse hole 146 of the restriction body 142.

The lower end of the elastic member 160 is connected to the guide member 136, and the upper end of the elastic member 160 is connected to the latch restriction part 140. Various kinds of biasing devices may be used as the elastic member 160 according to the embodiment of the present disclosure so long as they fall within a technical spirit that the elastic member 160 biases the latch restriction part 140 toward the guide member 136 by elastic force.

The upper end of the elastic member 160 is hooked to the hook element 148 which is provided to the lower end of the latch restriction part 140, and the lower end of the elastic member 160 is hooked to a hook element 137 which is provided to the bottom of the guide member 136.

Since the elastic member 160 according to the embodiment of the present disclosure uses a tensile coil spring, it is possible to provide excellent elastic force in view of a cost.

Hereafter, operations of the safety device 1 for a seat belt in accordance with the embodiment of the present disclosure will be described in detail with reference to the accompanying drawings.

Figure 5:
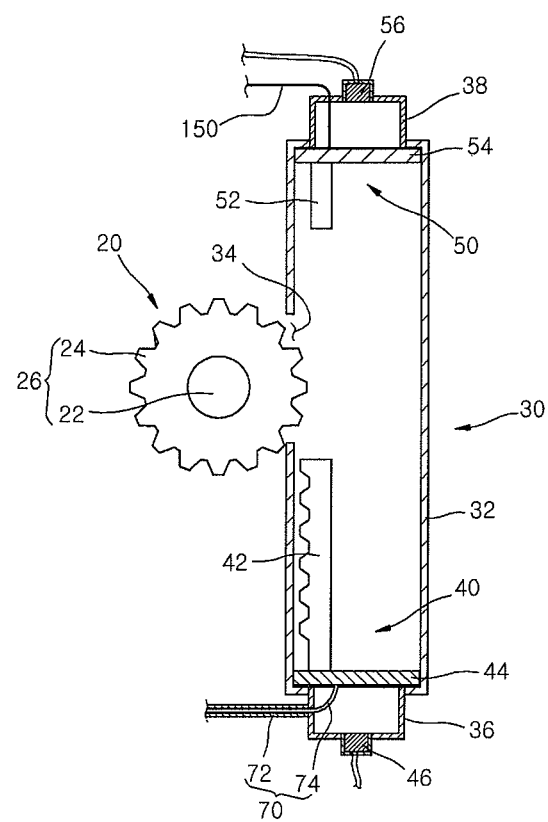
FIG. 5 is a cross-sectional view schematically illustrating a state before a pretensioner in accordance with the embodiment of the present disclosure operates.
Figure 6:
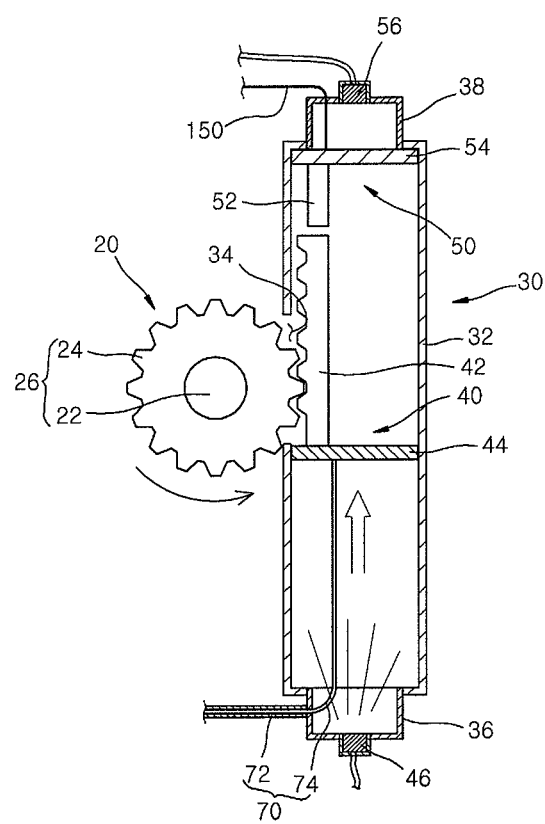
FIG. 6 is a cross-sectional view schematically illustrating a state in which the pretensioner in accordance with the embodiment of the present disclosure operates and a rack gear is rotated in a direction for winding a seat belt.
Figure 7:
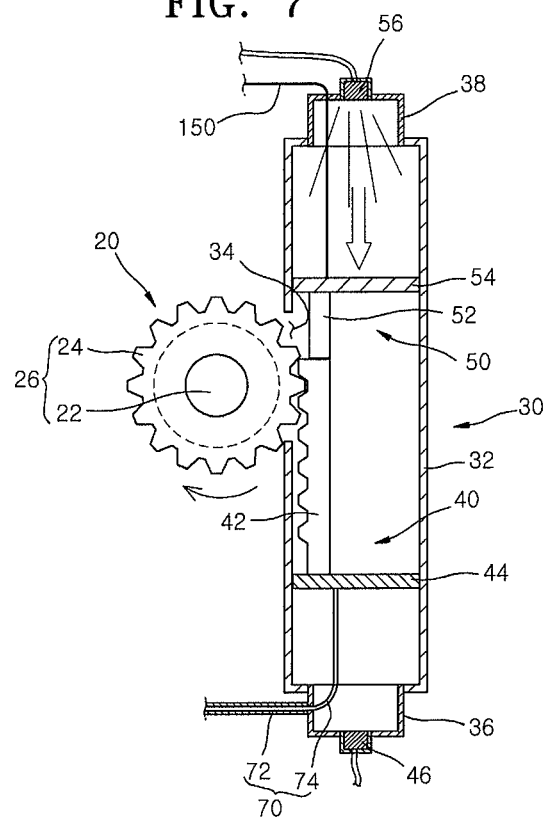
FIG. 7 is a cross-sectional view schematically illustrating a state in which a release unit in accordance with the embodiment of the present disclosure operates and pushes movable gears and the rack gear is rotated in a direction for unwinding the seat belt.

FIG. 5 is a cross-sectional view schematically illustrating a state before the pretensioner in accordance with the embodiment of the present disclosure operates, FIG. 6 is a cross-sectional view schematically illustrating a state in which the pretensioner in accordance with the embodiment of the present disclosure operates and the rack gear is rotated in the direction for winding the seat belt, and FIG. 7 is a cross-sectional view schematically illustrating a state in which the release unit in accordance with the embodiment of the present disclosure operates and pushes the movable gears and the rack gear is rotated in the direction for unwinding the seat belt.

As shown in FIG. 5, the movable gears 42 and the release gears 52 are disposed opposite each other with the rack gear 26 of the retractor 20 interposed therebetween.

As shown in FIGS. 2, 6 and 8, the control unit 100 which is transferred with the sensing value of the impact sensor 90 upon a collision of the car operates the first explosion part 46 of the pretensioner 40.

Alternatively, an electrical signal generated by the impact sensor 90 may be directly transferred to the first explosion part 46 without passing through the control unit 100 and may operate the first explosion part 46.

The gas produced by the explosion of the first explosion part 46 pushes the first support member 44 upwards, and the movable gears 42 are moved upward along with the first support member 44.

As the teeth formed on the side surfaces of the movable gears 42 are meshed with the rack gear 26, the rack gear 26 is rotated in the direction for winding the seat belt 12 (the counterclockwise direction in FIG. 6).

As the seat belt 12 is wound by a predetermined length by the rotation of the rack gear 26, an air bag may be deployed in a state in which the space between the occupant 10 and the seat 11 is narrowed, whereby it is possible to reduce injuries to the occupant 10.

Because the core wire 74 connected to the first support member 44 is also moved upward as the first support member 44 is moved upward, the other end of the core wire 74 which is inserted through the side of the button member 64 is separated from the button member 64.

Since the downward movement of the button member 64 becomes possible after the core wire 74 is separated from the button member 64, the occupant 10 presses the piezoelectric ceramic 86 by pushing the button member 64.

The electricity generated by pressing the piezoelectric ceramic 86 is transferred to the second explosion part 56 through the connection core wire 82.

As shown in FIGS. 1 and 7, by the gas produced as the second explosion part 56 is exploded, the second support member 54 is moved downward along the inside space of the housing 32.

Since the release gears 52 which are connected to the second support member 54 push the movable gears 42 downwards, the rack gear 26 which is meshed with the movable gears 42 is rotated in the direction for unwinding the seat belt 12 (the clockwise direction in FIG. 7).

By this fact, since the tension of the seat belt 12 is decreased, the occupant 10 may escape the car after unfastening the seat belt 12 from the buckle 14, whereby the safety of the occupant 10 may be improved.

Operations in the state in which the safety latch 120, the fastening buckle 130, the latch restriction part 140 and the release wire 150 are additionally disposed to improve the safety of the safety device 1 for a seat belt will be described below.

As shown in FIGS. 5 and 12, since the movement of the release wire 150 connected to the second support member 54 is restricted before the explosion of the second explosion part 56 is implemented, the movement of the restriction body 142 of the latch restriction part 140 is also restricted and the safety latch 120 is kept fastened to the fastening buckle 130.

That is to say, since the latch restriction part 140 projects out of the fastening buckle 130 through the engagement hole 124 of the latch body 122 and the buckle hole 133 of the buckle housing 132, the leftward and rightward movement of the latch body 122 is restricted.

Because the occupant 10 may check the fact that the latch restriction part 140 projects out of the buckle housing 132, it may be confirmed that the safety latch 120 is kept stably fastened to the fastening buckle 130.

As shown in FIGS. 7 and 13, as the second support member 54 is moved downward by the explosion of the second explosion part 56, the release wire 150 which is connected to the second support member 54 is moved and is separated from the transverse hole 146 of the latch restriction part 140.

Then, the latch restriction part 140 is moved downward by the weight of the latch restriction part 140 and the elastic force of the elastic member 160 which pulls the latch restriction part 140 downward.

Since the latch restriction part 140 is moved downward by being moved out of the engagement hole 124 of the latch body 122 and the buckle hole 133 of the buckle housing 132, the safety latch 120 may be unfastened from the fastening buckle 130.

As the seat belt 12 which passes over the abdomen of the occupant 10 becomes loose due to unfastening of the safety latch 120, the occupant 10 may unfasten the seat belt 12 from the buckle 14 and escape the car, whereby the safety of the occupant 10 may be improved.

As is apparent from the above descriptions, according to the embodiment of the present disclosure, since the pretensioner 40 operates and winds the seat belt 12 by the predetermined length upon a collision of a car and then an air bag may be deployed, a shock applied to the occupant 10 by the air bag may be reduced, whereby the safety of the occupant 10 may be improved.

Also, since manipulation of the switch unit 60 for operating the release unit 50 may be possible after the pretensioner 40 operates, the misoperation of the release unit 50 may be prevented, whereby the occurrence of a safety-related accident may be prevented.

Further, since the release unit 50 is operated and decreases the tension of the safety belt 12 after the pretensioner 40 operates, the seat belt 12 may be easily unfastened from the buckle 14, whereby the occupant 10 may safely escape the car.

Moreover, since the safety latch 120 may be unfastened from the fastening buckle 130 for fastening the seat belt 12 as the release wire 150 is disengaged from the latch restriction part 140 in conformity with the operation of the release unit 50, the safety of the occupant 10 may be further improved.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A safety device for a seat belt, comprising:
   a retractor having a rack gear on a circumferential outer surface of which the seat belt is wound;
   a pretensioner operated upon a collision of a car and rotating the rack gear in a direction for winding the seat belt;
   a release unit installed adjacent to the pretensioner, operated after the pretensioner operates the rack gear, and rotating the rack gear in a direction for unwinding the seat belt; and
   a switch unit receiving a manipulation force for operating the release unit, generating electricity, transferring the electricity to the release unit, and operating the release unit.

2. The safety device according to claim 1, wherein the pretensioner comprises:
   a movable gear having a side surface on which teeth to be meshed with the rack gear are formed;
   a first support member supporting the movable gear; and
   a first explosion part exploded by an operation of an impact sensor, and moving the first support member in a direction facing the rack gear.

3. The safety device according to claim 2,
   wherein the pretensioner and the release unit are disposed in a housing, and
   wherein the first support member is pushed by a pressure of a gas produced due to an operation of the first explosion part and is moved in the housing.

4. The safety device according to claim 3, wherein the first explosion part is disposed in a first projection, and the gas produced as the first explosion part is operated moves the first support member and the movable gear in a direction facing away from the first explosion part.

5. The safety device according to claim 2, wherein the release unit comprises:
   a release gear disposed at a position opposite to the movable gear;
   a second support member supporting the release gear; and
   a second explosion part exploded by the electricity transferred from the switch unit, and moving the second support member in a direction facing the first support member.

6. The safety device according to claim 5,
   wherein a pair of movable gears are installed on the first support member to be parallel to each other, and
   wherein a pair of release gears for pushing the movable gears are installed on the second support member to be parallel to each other.

7. The safety device according to claim 5,
   wherein the pretensioner and the release unit are disposed in a housing, and
   wherein the second support member is pushed by a pressure of a gas produced due to an operation of the second explosion part and is moved in the housing.

8. The safety device according to claim 7, wherein the second explosion part is disposed in a second projection, and the gas produced as the second explosion part is operated moves the second support member and the release gear in a direction facing away from the second explosion part.

9. The safety device according to claim 1, wherein the switch unit comprises:
   a case defining an outer shape of the switch unit;
   a button member installed in the case and operated in a push type;
   a first connection part connecting the button member and the pretensioner, separated from the button member by an operation of the pretensioner, and releasing restriction of the button member; and
   a second connection part converting a pressing operation of the button member into electricity, and transferring the electricity to the release unit.

10. The safety device according to claim 9, wherein the second connection part comprises:
    a piezoelectric ceramic receiving a pressure through the button member, and generating electricity; and
    a connection core wire transferring the electricity generated by the piezoelectric ceramic, to the release unit.

11. The safety device according to claim 1, further comprising:
    a safety latch connected to one end of the seat belt which is installed in a shape passing over the abdomen of an occupant;
    a fastening buckle having a mounting space into which the safety latch is inserted, and secured to the car;
    a latch restriction part installed to be movable into and out of the fastening buckle, and fastened to the fastening buckle through the safety latch; and
    a release wire inserted into the fastening buckle, passing through the latch restriction part, moved by an operation of the release unit, and releasing restriction of the latch restriction part.

12. The safety device according to claim 11, wherein the fastening buckle comprises:
    a buckle housing secured to the car, and having a buckle hole which allows the latch restriction part to pass therethrough; and
    a guide member secured in the buckle housing, formed into a shape for receiving the latch restriction part, and guiding movement of the latch restriction part.

13. The safety device according to claim 12, wherein the latch restriction part comprises:
    a restriction body extending in a vertical direction;
    engagement protrusions projecting from side surfaces of the restriction body to be engaged with the safety latch; and
    a transverse hole defined through the restriction body, and allowing the release wire to be inserted therethrough.

14. The safety device according to claim 13, wherein one end of the release wire is connected to the second support member of the release unit, and the other end of the release wire is movable through the transverse hole of the restriction body.

15. The safety device according to claim 12, further comprising:
    an elastic member having a lower end which is connected to the guide member and an upper end which is connected to the latch restriction part, and pulling the latch restriction part in a direction facing the guide member by elastic force.

* * * * *